(12) United States Patent
Graham

(10) Patent No.: US 6,631,372 B1
(45) Date of Patent: Oct. 7, 2003

(54) SEARCH ENGINE USING SALES AND REVENUE TO WEIGHT SEARCH RESULTS

(75) Inventor: Paul Graham, Los Altos, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 09/249,828

(22) Filed: Feb. 12, 1999

Related U.S. Application Data

(60) Provisional application No. 60/074,678, filed on Feb. 13, 1998.

(51) Int. Cl.$^7$ ............................................. G06F 17/300
(52) U.S. Cl. ................................ 707/5; 707/4; 705/26
(58) Field of Search ....................... 707/1–5, 6; 705/26, 705/37, 14

(56) References Cited

U.S. PATENT DOCUMENTS

| | | | | |
|---|---|---|---|---|
| 4,433,392 A | * | 2/1984 | Beaven | 707/6 |
| 5,758,328 A | * | 5/1998 | Giovannoli | 705/26 |
| 5,794,210 A | * | 8/1998 | Goldhaber et al. | 705/14 |
| 5,864,822 A | | 1/1999 | Baker, III | |
| 5,895,454 A | * | 4/1999 | Harrington | 705/26 |
| 5,913,202 A | * | 6/1999 | Motoyama | 705/35 |
| 5,935,207 A | * | 8/1999 | Logue et al. | 709/219 |
| 6,014,644 A | * | 1/2000 | Erickson | 705/37 |
| 6,014,647 A | * | 1/2000 | Nizzari | 705/39 |
| 6,016,504 A | * | 1/2000 | Arnold et al. | 709/200 |
| 6,041,323 A | * | 3/2000 | Kubota | 707/5 |
| 6,055,516 A | * | 4/2000 | Johnson et al. | 705/27 |
| 6,055,538 A | * | 4/2000 | Kessenich et al. | 707/101 |
| 6,128,624 A | * | 10/2000 | Papierniak et al. | 707/104 |
| 6,134,534 A | * | 10/2000 | Walker et al. | 705/26 |
| 6,169,992 B1 | * | 1/2001 | Beall et al. | 707/103 R |
| 6,223,215 B1 | * | 4/2001 | Hunt et al. | 709/217 |
| 6,308,175 B1 | * | 10/2001 | Lang et al. | 707/10 |
| 6,314,420 B1 | * | 11/2001 | Lang et al. | 707/3 |
| 6,317,741 B1 | * | 11/2001 | Burrows | 707/5 |
| 6,366,956 B1 | * | 4/2002 | Krishnan | 709/223 |

OTHER PUBLICATIONS

M2D Presswire, Buy It Online: But It onLine adds new search engine, Oct. 30, 1996 pp. 1–3.

* cited by examiner

Primary Examiner—Greta Robinson
Assistant Examiner—Debbie M. Le
(74) Attorney, Agent, or Firm—Townsend and Townsend and Crew LLP

(57) ABSTRACT

A search engine selects one or more search hits from among a plurality of hits, wherein a hit is a reference to a page or a site, based on a user interest, comprising an input module for accepting a query from a user, the query representing an interest of the user; a tracking module for tracking the user's navigation through the plurality of pages, including at least a destination purchase page, the destination purchase page being a page from which the user makes a purchase; a sales module which records associations between purchases and queries where the associations are provided, at least in part by an output of the tracking module; and a search module, which takes as its inputs at least a query and sales associations of that query provided by the sales module, and which outputs one or more search hits based on at least the query and the sales associations of that query. In some systems, instead of using sales data to alter the weights of the search results, merchant bidding is used to alter the weights of the search results, or a combination of the two is used.

32 Claims, 2 Drawing Sheets

SEARCH ENGINE USING SALES AND REVENUE TO WEIGHT SEARCH RESULTS

CROSS REFERENCE TO RELATED APPLICATIONS

The present application claims priority from U.S. Provisional Patent Application No. 60/074,678, filed Feb. 13, 1998. That application is incorporated by reference herein for all purposes.

BACKGROUND OF THE INVENTION

The present invention relates to search engines and more specifically to search engines used to locate goods and services on the Internet.

A Web page is a sequence of text, optionally including images, that can be requested from a client, such as a Web browser, from a computer or Web server on a network. A Web site is a collection of stored or dynamically generated Web pages.

A URL is a string of characters that serves as the address of a Web page. A client sends a URL to a Web server, and receives the corresponding Web page in return.

Some Web pages allow visitors to make purchases. For example, a Web page may contain information about an item for sale, along with a button that allows the person seeing the page to place an order for it.

A search engine is a program that helps users find information in a network of Web pages. Users submit to the search engine words or phrases indicating what they a searching for, and the search engine replies with a list of Web pages it predicts are relevant to that query. The page considered by a search engine for inclusion in this list can be termed a "target page".

The list of Web pages returned by a search engine is ranked by relevancy. Typically, relevancy is determined mostly by the content of the target pages.

For example, if the user searches for "chocolate cake", a typical search engine will rank pages containing the phrase "chocolate cake" before those which merely contain the words "chocolate" and "cake" separately, and those pages will in turn be ranked higher than pages that contain one of the two words but not the other.

One of the reasons people use search engines is to search for items for sale. A user who wants to buy a digital camera online will often begin by going to a search engine and using "digital camera" as the search phrase.

Existing search engines vary in how they rank pages. The rank of a target page usually depends in part on a textual match with the search phrase. Search engines designed specifically for online shopping may also look at information on the target page, such as price and availability, and use that to determine the ranking. The Web site in which a page occurs may also influence the ranking of that page.

In general, a search occurs as follows: (1) the user submits a query Q to a search engine, (2) the search engine returns a list of target pages, ranked based on their content, (3) the user goes to one of the pages in the list of search results and perhaps, while visiting the Web site containing that page, places an order. However, someone searching for the name of a product, like "digital camera", probably wants to buy it, and so wants to be given a list of pages where they can do so.

The search engines depend on site and page contents. For example, suppose that a search engine knows of two sites, A and B, that each have pages containing the phrase "digital camera". The two pages score the same for that phrase using whatever algorithm the search engine uses to rank pages. But whereas Site A is a well-designed site inspiring the consumer to buy, Site B is not well designed and does not appeal to customers. To maximize sales, the search engine should preferably rank Site A before Site B. However, short of having a human look at both sites, it is difficult to ensure that the page from Site A appears ahead of the page from Site B in the search results.

SUMMARY OF THE INVENTION

A search engine selects one or more search hits from among a plurality of hits, wherein a hit is a reference to a page or a site, based on a user interest, comprising an input module for accepting a query from a user, the query representing an interest of the user; a tracking module for tracking the user's navigation through the plurality of pages, including at least a destination purchase page, the destination purchase page being a page from which the user makes a purchase; a sales module which records associations between purchases and queries where the associations are provided, at least in part by an output of the tracking module; and a search module, which takes as its inputs at least a query and sales associations of that query provided by the sales module, and which outputs one or more search hits based on at least the query and the sales associations of that query. In some systems, instead of using sales data to alter the weights of the search results, merchant bidding is used to alter the weights of the search results, or a combination of the two is used.

A further understanding of the nature and advantages of the inventions herein may be realized by reference to the remaining portions of the specification and the attached drawings.

DESCRIPTION OF THE SPECIFIC EMBODIMENTS

In the figures, like numbers indicate like (but not necessarily identical) elements. In some cases, where many like elements are shown, not all of the like elements are called out with numbers, so that the figures are not unduly cluttered. In some instances, a number is followed by a letter in parenthesis to indicate a specific subclass of otherwise like elements.

With the present invention, users can search for pages related to goods and services by submitting a search phrase to a search engine and having the search engine return "hits" (relevant pages or sites) on that search phrase. The relevance of the hits presented are a function of the search phrase, but the relevance is adjusted, by weighting or otherwise, based on sales, revenue or bidding data. The sales data indicates associations between search terms and purchases, such that when a search beginning with particular search term tends to result in a particular purchase, an association is noted in the sales data. That association is used to more heavily weight the pages or sites that correspond to purchases identified in the association. The revenue and bidding data is data provided by merchants used to modify weighting based on merchant interests.

Figure 1:
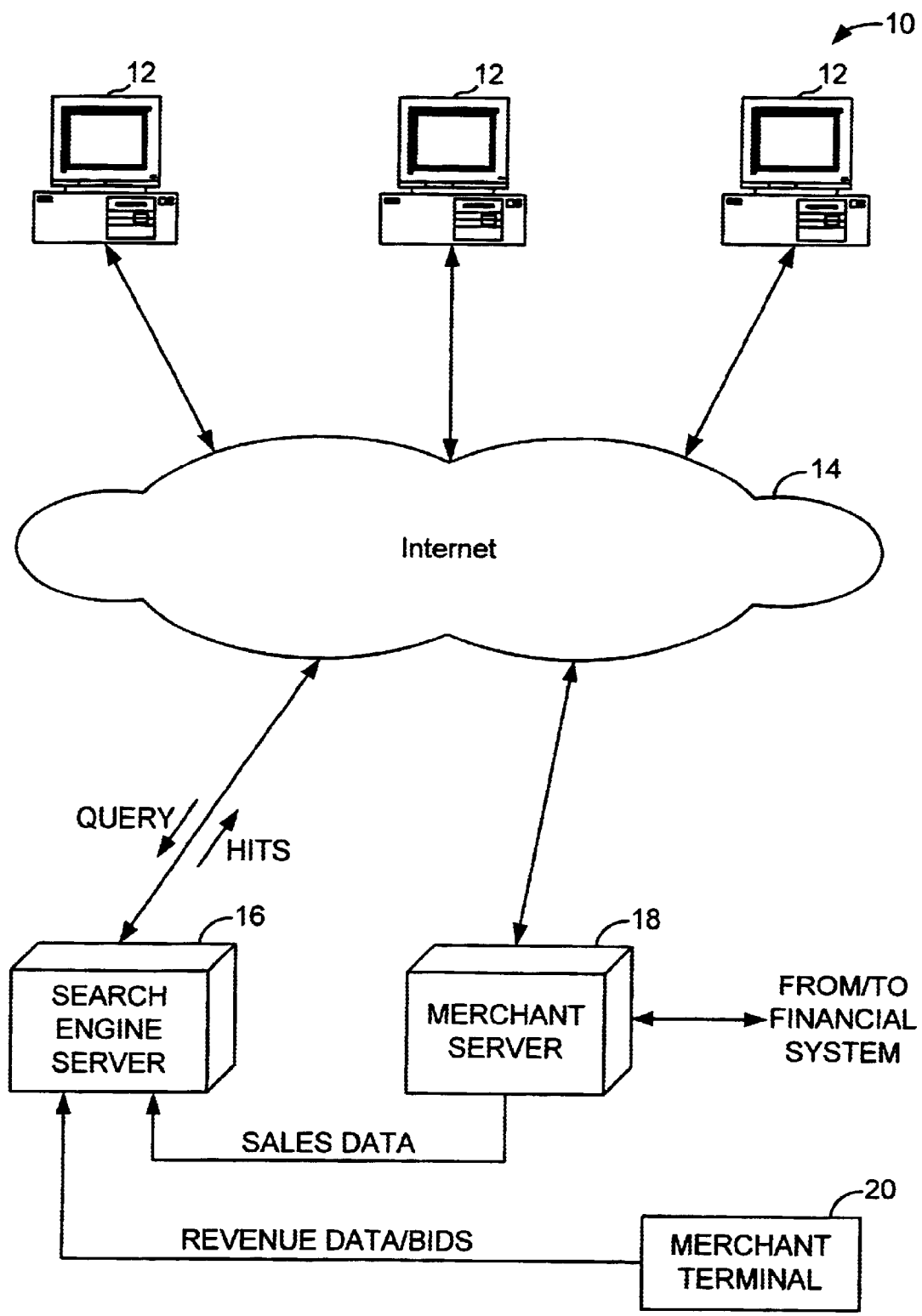
FIG. 1 is a block diagram of a computer network in which the present invention is used.

One arrangement of computer elements implementing one aspect of the present invention is shown in FIG. 1. In a computer network 10, clients 12 are coupled through Internet 14 to a search engine server 16 and a merchant server 18. In practice, many more clients would be connected than the three clients shown. Only one search engine server and one merchant server are shown, but more than one of each is possible.

FIG. 1 shows connections of each client 12 and servers 16, 18 to Internet 14 for intercommunication, as well as a connection between merchant server 18 and search engine server 16 for passing sales data to search engine server 16. Other connections shown include a connection between the merchant server and a financial system and a connection between a merchant terminal 20 and search engine server 16.

Several elements in the system shown in FIG. 1 are conventional, well-known elements that need not be explained in detail here. For example, a client 12 could be a desktop personal computer, workstation, cellular telephone, personal digital assistant (PDA), laptop, or any other computing device capable of interfacing directly or indirectly to the Internet. The present invention does not require the Internet, which refers to a specific global inter-network of networks, but is shown with the Internet as the mechanism for interconnection because that is the most likely mechanism where the present invention will be used. Notwithstanding the above, it should be understood that other networks can be used in place of Internet 14 in FIG. 1, such as an intranet, an extranet, a virtual private network (VPN), a non-TCP/IP based network, or the like. The interconnections between merchant systems and the search engine are shown outside Internet 14, but those connections might also be handled over Internet 14. Except for the details described herein and their equivalents, the invention can be implemented starting with a conventional merchant server with its connections to financial system, so further details of the precise operation of a merchant server need not be set out here. Client 12 typically runs a browsing program allowing a user of client 12 to browse pages available to it from servers connected to Internet 14.

Figure 2:
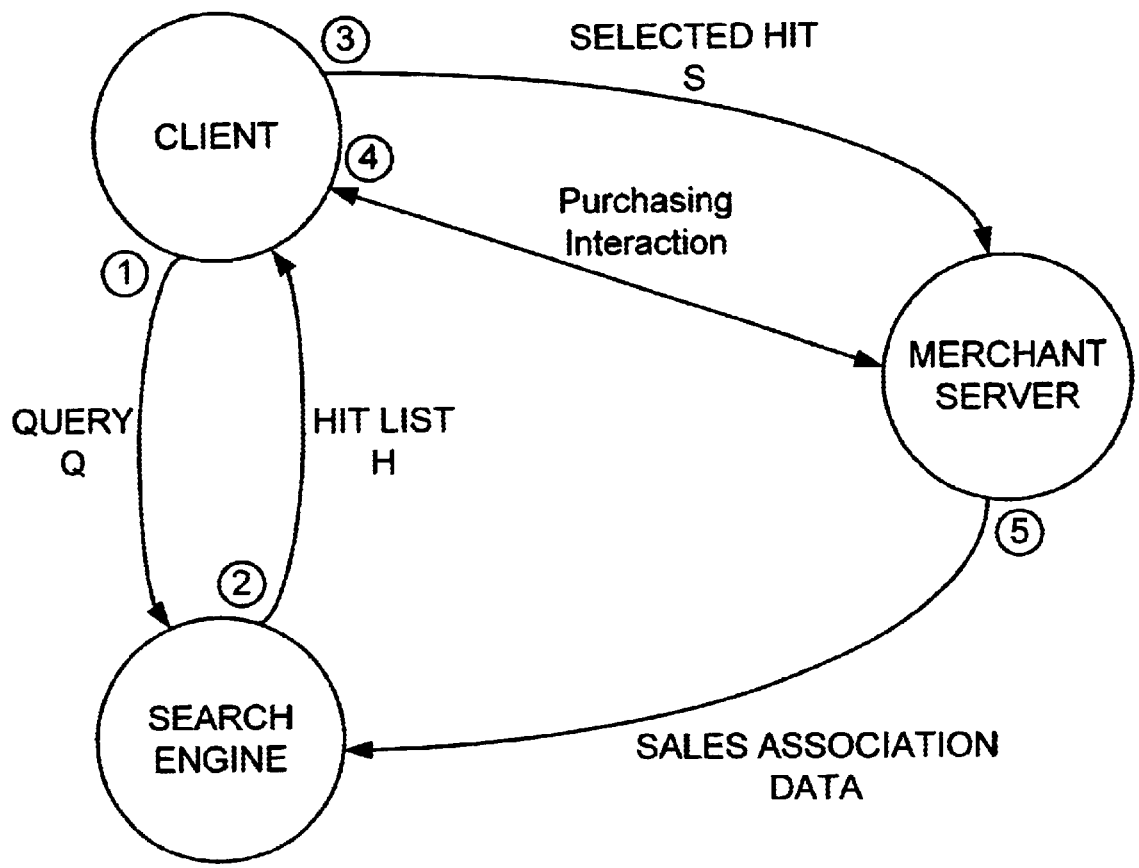
FIG. 2 is a logical diagram showing the interaction in one process using the elements of the apparatus shown in FIG. 1.

While FIG. 1 illustrates one arrangement of hardware components, FIG. 2 illustrates one process for passing data among those components according to one aspect of the present invention. The steps of the process are numbered in the order that they are likely to occur. The process illustrated in FIG. 2 begins with a user using a client to submit a query, Q, to a search engine (step 1). Typically, queries are in the form of search strings, such as "chocolate cake" or "digital video camera", but queries might take other forms, such as selections from pick lists or other data representing the interests of the user.

The search engine then uses query Q to come up with a hit list, H. Hit list H has entries that either represent specific pages, specific sites or both. Typically, a specific page is represented by a URL of the form "http://hostdomain/path/filename" and a site might be represented by a UAL of the form "http://hostdomain". As explained below, hit list H is a list of those pages found to be weighted most relevant for query Q. Once hit list H is generated, it can be sent to the client for user review (step 2). In some cases, if the hit list is larger than a threshold number of hits, only part of the list is sent at a time. For example, if the list contains 500 hits, the initial set to the client might be only 20 hits, preferably the most relevant 20 hits.

When the client receives hit list H, in whole or part, it displays the received hits for user selection. The user selects a hit and the client navigates the user's browser to the page or site referenced by the hit by sending the URL for the hit to the appropriate server (step 3), typically a merchant's server if the user is looking for goods or services to purchase. Once the user navigates to the merchant server, the user will perform a purchasing interaction (step 4). Broadly construed, anything the user does at the merchant site is a purchasing interaction, such as looking around the site at the merchant's offerings, purchasing goods or services, or declining to make a purchase. The merchant server keeps track of the purchasing interactions and provides sales association data based on the purchasing interactions to the search engine (step 5). The merchant server can provide a record of what occurred for each interaction, or the merchant server can collect many records and send them in bulk to the search engine.

If the search engine and the merchant engine are operated by a single entity, that entity can identify which search terms go with which purchasing interactions by following the user. For example, a search/merchant engine could ask a user to log in for a session and each of the queries and hit lists could be recorded for a session. The engine would also track which purchases interactions were made with which pages selected from a hit list. In practice, however, the merchant servers will probably be independent of the search engine. To address this, URL encoding of the query might be used.

An example of URL encoding will be described, but many other methods could be used. With URL encoding, the hit list of URLs provided to the user point to particular hits (pages or sites) and contain additional information that either identifies the query itself or references a session in which the user made the search. For example, a URL for a page on digital video cameras could include extra information representing the query "digital video camera" or just a query number that the search engine can use with a table lookup to identify the search term. Preferably, the queries are encoded in such a way that they cannot be easily forged by merchants seeking to skew searches to their sites.

The merchant server records the extra information that arrives with the URL that the user selected. When the user finishes the purchasing interaction, which the merchant hopes is a purchase, the result of the purchasing interaction is provided to the search engine server along with the extra information provided with the URL sent to the merchant server by the client.

As the process of FIG. 2 is repeated many times, over many users and many search terms, the search engine will approach a state where similarly minded purchasers will proceed through the process of FIG. 2 and find that they are being directed to hits that are highly relevant for what it is they are interested in purchasing. This is because the search engine returns a list of target pages, ranked by a combination of a textual match and additional data about the sales associated with the queries used by users.

One interesting side effect of the process described above is that uninteresting sites will be filtered out, if few people are interested in the offerings at those sites. Also, common spelling errors will tend to get fixed. For example, if users searching for "compact disc player" end up spending considerable money at sites offering compact disc players, then those pages will have a higher relevance for that search phrase, even though the phrase "compact disc player" is not present on those pages.

In one embodiment of the invention, the data sent back from the target site to the search engine includes, for each search phrase, the number of visitors arriving with that search phrase encoded in the URL and for each item ordered by a visitor, the search phrase used, the amount spent, the URL of the arrival page, the URL of the page where the item was ordered. This information is used to influence the rankings of target pages as follows: In addition to whatever score a target page might have received for Q from the search engine's content-based ranking method, a target page gets another score consisting of an estimate of the amount of revenue that will be generated, on average, if the user goes to the target page. In one embodiment, these two scores are combined to produce the score used for ranking the target page.

In one embodiment, the method for estimating the revenue that will be generated from a target page is based on the average sales per capita from orders placed from that target page, by visitors whose queries match Q, during some past time period. Another variant would be to calculate sales per capita from users who arrived through that target page.

The rankings produced by this method differ from rankings based mainly on textual matches. In one possible example, if it turned out that users searching for "chocolate" spent the most money on pages selling diet pills, then such pages are given a high rank, even if they did not contain the phrase "chocolate" at all.

Data about what users do when they arrive at target sites is fed back to the search engine and used to adjust the rankings of the target sites. A site that would do well based on textual match, but which ultimately, for whatever reason, does not give the users what they were looking for, will tend to slip down in the rankings. Sites that consumers do buy from will tend to rise.

This provides a benefit for the search engines, in that (with no human intervention) the system naturally tends toward an equilibrium that maximizes their revenues. It is also a benefit for the consumer, since for consumers doing product searches, the ranking of sites is based on whether they found what they wanted.

In one embodiment of the invention, because target sites may offer search engines varying percentages of their sales, the number used by the search engine to rank a page should be the average sales per capita from past users searching for that (or related) phrases, multiplied by the percentage of sales offered by the target site.

The search engine can operate at three different levels of precision. At a first level, the search engine uses the sales association data fed back form the merchant server to rank individual pages in a target site associated with query Q. At a second level, the search engine can use the sales association data to calculate an overall average revenue per capita for query Q at the target site and use that to adjust the relevance of ranking of any page in that site. At the next level, the search engine uses the sales association data to calculate an overall average revenue per capita at the target site for all queries, and uses that value to influence the ranking of any page in that site. The appropriate level of precision depends on sample size. These calculations would be useful even in the last, most general case (Level 3) in that it would tend to eliminate the sites that did not impress visitors.

In one embodiment, data about recent orders is weighted more heavily than older data. In another embodiment, some amount of randomness is included in the ranking of target pages, in order to prevent low ranking pages from becoming too lowly ranked just because of their initial ranking. One way to include randomness would be, for every N-th search, to randomly reshuffle the presentation order of the top-ranking M target pages, for some N and M.

The methods described above provide a way for new sites to get traffic despite having no sales initially. One possible approach is to include some pages with zero sales in the random reshuffling described above.

In a further embodiment, the method is refined by defining the denominator for sales per capita as the number of times a link to the target page was shown to users at the search engine (perhaps weighted by placement on the page), rather than the number of times users chose to visit that target page. Though more costly to calculate, this approach comes closer to the ideal ranking of target pages to maximize revenue.

In calculating the ranking of a target page P for a query Q, the weighting of the sales-based component should increase with the sample size (the number of orders placed by users who searched for queries matching Q at the site containing P) and the frequency of queries matching Q. If many users search for Q, and many of those in turn buy something at P, then P ranks high in a search for Q.

In the case of Web sites with dynamically generated URLs that contain more information than necessary to identify the page, the URLs for pages kept at the search engine and sent back in the data should be base URLs that uniquely identify each page.

Another beneficial side effect of the above-described methods is that a search engine can be used for noncommercial as well as commercial searches, using the same criteria. For example, users searching for "election results" will spend little money, if any, as a result of their searches. The resulting revenue per capita for that key phrase will be low over all hits, and any revenue-based score would not contribute significantly to the ranking of the pages for that query.

In addition to using purchasing interaction information to alter the relevance weighting of hits, merchants might be allowed to alter the relevance weightings by bidding for search terms. In the system of FIG. 1, this information might be supplied via merchant terminal 20.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A search engine for generating a list of hits in response to a query, wherein a hit is a reference to a page or site, the search engine comprising:

a search module configured to receive from a user a current query containing a current search term and further configured to generate a current list of hits based on the current query and a set of purchasing interaction associations, the set of purchasing interaction associations based on a set of previous queries;

a tracking module configured to track user navigation to a target page or site from the current list of hits, to detect a purchasing interaction of the user with the target page or site, and to generate a purchasing interaction record; and a sales module configured to communicate with the search module and the tracking module, the sales module configured to receive the purchasing interaction record from the tracking module and further configured to add to the set of purchasing interaction associations an association between the purchasing interaction record and the current query.

2. The search engine of claim 1, wherein the current search term comprises a word.

3. The search engine of claim 1, wherein the current search term comprises a plurality of words.

4. The search engine of claim 1, wherein the current search term comprises a selection from a pick list.

5. The search engine of claim 1, wherein each query in the set of previous queries includes the current search term.

6. The search engine of claim 1, wherein the purchasing interaction includes viewing goods or services offered at the target page or site.

7. The search engine of claim 1, wherein the purchasing interaction includes making a purchase.

8. The search engine of claim 7, wherein the purchasing interaction record includes a price of the purchase.

9. The search engine of claim 1, wherein the purchasing interaction includes declining to make a purchase.

10. The search engine of claim 1, wherein a hit comprises an encoded URL configured to provide extra information.

11. The search engine of claim 10, wherein the extra information includes a representation of the current query.

12. The search engine of claim 1, wherein the search module comprises:
    an input module configured to receive the current query; and
    a ranking module configured to determine an order for the current list of hits based on at least a first weighting and a second weighting, wherein the first weighing is based on occurrences of the current search term in the page or site referenced by the hit and the second weighting is based on purchasing interaction associations of the page or site referenced by the hit.

13. The search engine of claim 12, wherein the second weighting comprises an estimate of an amount of revenue generated by an average user visiting the page or site referenced by the hit, determined from the set of purchasing interaction associations.

14. The search engine of claim 13, wherein the estimate is based on average sales per capita for the page referenced by the hit, determined from the set of purchasing interaction associations.

15. The search engine of claim 14, wherein the estimate is further based on multiplying the average sales per capita by a commission percentage payable to an entity operating the search engine.

16. The search engine of claim 12, wherein the second weighting includes a time of the purchasing interaction association.

17. The search engine of claim 12, wherein the ranking module is furt her configured to randomly reorder a subset of the current list of hits after determining the order.

18. The search engine of claim 12, wherein the ranking module is further configured to adjust the order of the current list of hits when the current query matches a reserved query, the reserved query being reserved by an entity operating one of the pages referenced on the list of hits.

19. A method for operating a search engine, comprising:
    receiving a first user query;
    providing a first list of hits based on the first user query, each hit being a reference to a page or site;
    tracking user navigation from the first list of hits to a target page or site;
    detecting a purchasing interaction of the user with the target page or site;
    recording an association between the purchasing interaction and the first user query;
    receiving a second user query; and
    providing a second list of hits based on the second user query and the recorded purchasing interaction association.

20. The method of claim 19, wherein each of the first query and the second query includes a matching search term.

21. The method of claim 19, wherein each hit comprises an encoded URL configured to carry extra information.

22. The method of claim 21, wherein the extra information includes a representation of the first query.

23. The method of claim 22, wherein recording an association between the purchasing interaction and the first user query comprises using the extra information to identify the first query.

24. The method of claim 21, wherein tracking user navigation comprises receiving the encoded URL when the page or site is selected.

25. The method of claim 19, wherein detecting a purchasing interaction comprises detecting at least one of the following user actions:
    viewing goods or services offered at the target page or site;
    making a purchase of goods or services; and
    declining to make a purchase of goods or services.

26. The method of claim 19, wherein providing a second list of hits based on the second user query and the recorded purchasing interaction association comprises:
    generating a first weighting for each of a plurality of candidate pages or sites based on occurrences therein of a search term contained in the second user query;
    generating a second weighting for each of the plurality of candidate pages or sites based on a set of purchasing interaction associations including at least the recorded purchasing interaction association; and
    ordering the plurality of candidate pages or sites based on at least the first weighting and the second weighting.

27. The method of claim 26, wherein generating a second weighting comprises estimating an amount of revenue generated by an average user visiting the candidate page or site.

28. The method of claim 27, wherein generating a second weighting further comprises multiplying the estimated amount of revenue by a commission percentage payable to an entity operating the search engine.

29. The method of claim 26, further comprising:
    adjusting the ordering of the plurality of candidate pages or sites when the second query matches a reserved query, the reserved query being reserved by an entity operating one of the plurality of candidate pages or sites.

30. The method of claim 26, further comprising:
    randomly reordering a subset of the plurality of candidate pages or sites after ordering the plurality of candidate pages or sites.

31. The system of claim 1, wherein the search module is further configured to identify hits for inclusion in the current list of hits based on the current search term and to order the identified hits based on associations between the current search term and previous purchases made at pages or sites referenced by the identified hits, the associations being included in the set of purchasing interaction associations.

32. A method for operating a search engine, comprising:

receiving a first user query;

providing a first list of hits based on the first user query, each hit being a reference to a page or site;

tracking user navigation from the first list of hits to a target page or site;

detecting a purchasing interaction of the user with the target page or site;

recording an association between the purchasing interaction and the first user query;

receiving a second user query; and providing a second list of hits based on the second user query and the recorded purchasing interaction association, wherein providing the second list of hits includes:

identifying pages or sites that include a search term of the second user query, including the target page or site; and ranking the identified pages or sites based on recorded associations between purchasing interactions and the search term of the second user query.

* * * * *